April 12, 1949.  R. HALL  2,467,259
FLUID METER
Filed Nov. 14, 1944  3 Sheets-Sheet 1

INVENTOR.
ROBERT HALL
BY
Parry + Miller

April 12, 1949.　　　　　R. HALL　　　　　2,467,259
FLUID METER
Filed Nov. 14, 1944　　　　　　　　　　3 Sheets-Sheet 2
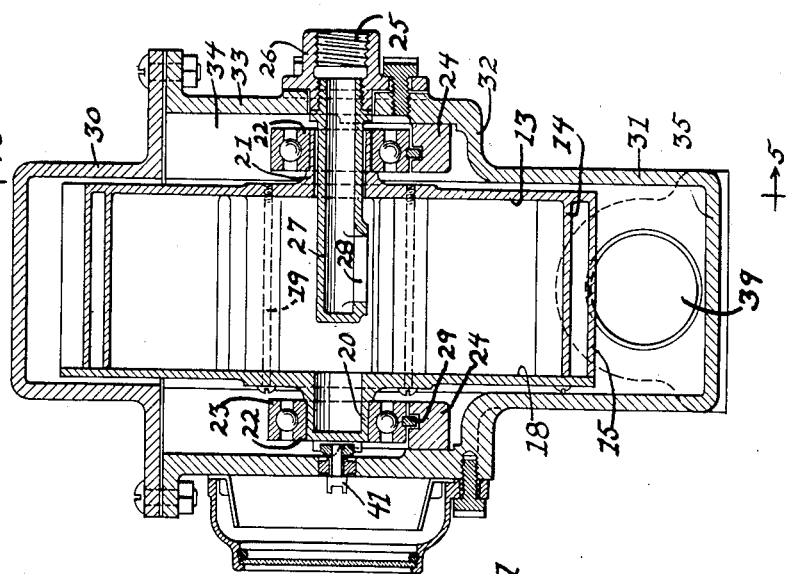
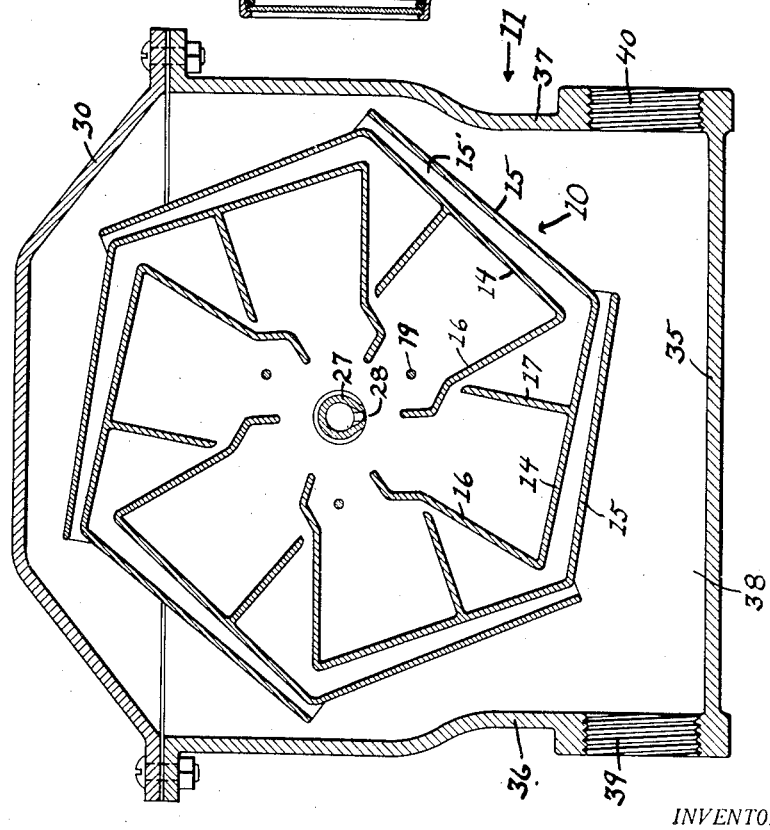
INVENTOR.
ROBERT HALL
BY
Parry + Miller

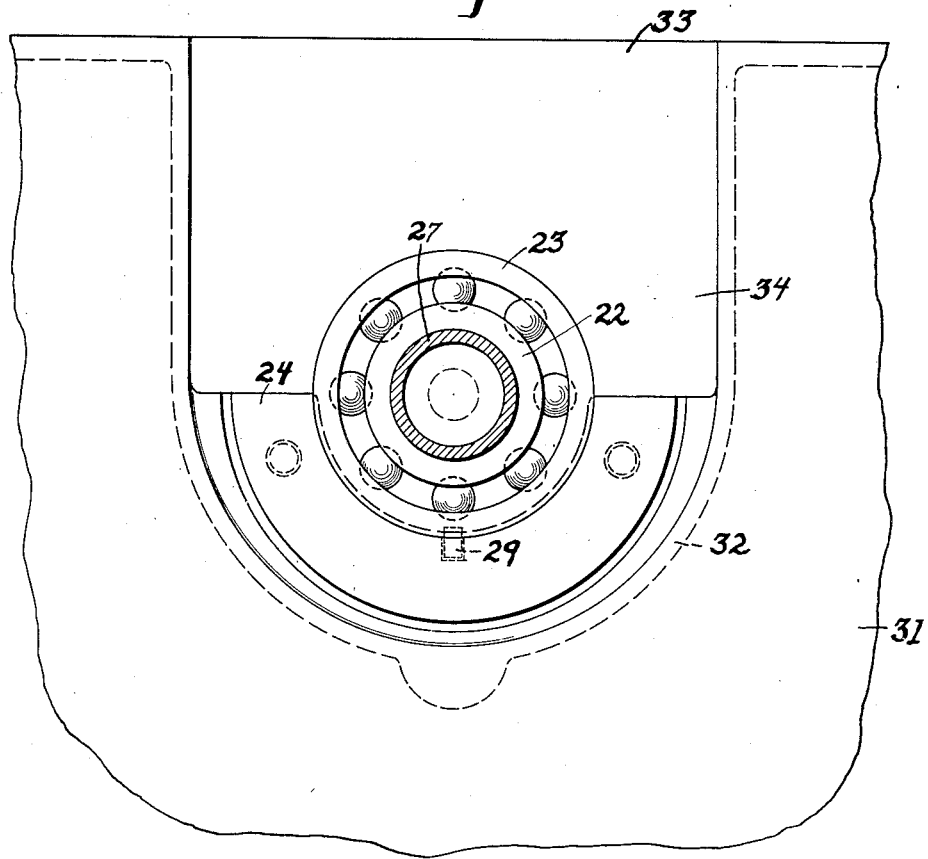

Patented Apr. 12, 1949

2,467,259

UNITED STATES PATENT OFFICE 2,467,259

FLUID METER

Robert Hall, Lockport, N. Y., assignor to American District Steam Company, North Tonawanda, N. Y., a corporation of New York Application November 14, 1944, Serial No. 563,405

5 Claims. (Cl. 73—217)

This invention relates to liquid measuring meters for measuring steam condensate and other liquids, and is directed to improvements in the type of meter shown in Everett R. Benedict Patent No. 1,649,653, November 15, 1927, and my prior Patent No. 2,039,246, April 28, 1936.

Meters of the type referred to comprise a rotor having a circumferentially arranged series of measuring compartments to which the liquid to be measured is successively delivered radially from the center of the rotor and discharged at the periphery of the rotor into a surrounding casing supporting a counter which registers the amount of liquid delivered through the rotor.

While meters of this type have proved their general soundness of construction and operating efficiency over many years their measuring accuracy has not been perfect. One source of error was earlier discovered to be delivery of the incoming liquid to several compartments of the rotor simultaneously, and was corrected by a special arrangement of nozzle as set forth in my above referred to prior patent. Other sources of errors have now been discovered and corrected through the structural improvements of the present invention.

Generally described, the present improvements are directed to increasing the measuring accuracy of the meter by overcoming factors which have been found to impair correct rotation of the rotor by the liquid under measurement and the rotative balance thereof. Because these meters work under varying operating conditions of temperature and wide differences in the amount of liquid handled at different times, the accurate measurement of the liquid requires on the one hand an extreme sensitivity of the rotor to the liquid passing therethrough, and on the other hand stability, ruggedness and careful design to withstand adverse influences tending to decrease, increase or produce fluctuations in the rotative speed of the rotor required to accurately measure the liquid. Unless the rotative balance is perfect the rotor will fluctuate in speed and the quantity of liquid handled by the different measuring compartments will vary. If the rotor be subject to mechanical or liquid produced drag or acceleration, even though slight, the resulting operating error over periods of days, weeks or months is of serious consequence and seriously detracts from the utility and reliability of the meter.

One particular source of difficulty is to provide a meter which will operate accurately under varying rates of liquid which may range from one hundred pounds to over one thousand pounds per hour. While the meters are designed to operate at not greater than a maximum rated capacity, it not infrequently happens that for short periods and sometimes for longer periods operating conditions are encountered where the meters must operate at up to 150% or more of their rated capacity. The present invention is designed to improve operating efficiency under such extreme conditions, and to do so without increasing the overall meter size.

Improved meter construction and its advantages will be understood from the embodiments illustrated in the accompanying drawings and the description which follows.

In the drawings:

Fig. 3 is a longitudinal section corresponding to Fig. 1;

Fig. 4 is a transverse section; and,

Fig. 5 is an enlarged fragmentary view showing certain details of construction.

Figure 2:
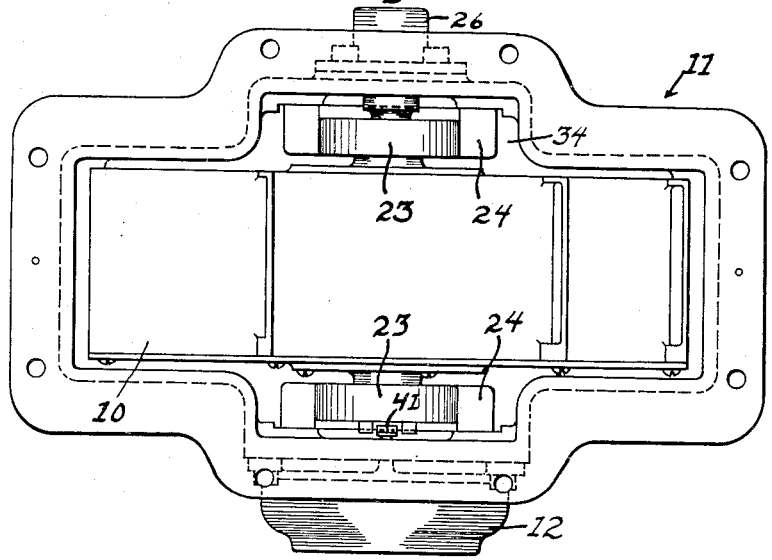
Fig. 2 is a top plan view with the casing cover removed to show interior details.

The improved meter shown in the drawings comprises a rotor 10, a casing 11 and recorder or counter 12 secured to one side of the casing.

As previously the rotor is formed to include a circumferential series of measuring chambers each having a bottom wall 14, an adjoining angularly related wall 15 defining with the bottom wall of the next chamber, a compartment discharge passage 15', an end wall 16 and baffle plate 17 of lesser height than the end wall and dividing the chamber into two parts. Liquid is introduced into the rotor at the center through a nozzle hereafter referred to and is delivered vertically downward into the part of the chamber between end wall 16 and baffle 17 until it has reached the upper edge of the baffle, whereupon it overflows into the right hand part of the chamber to rise therein and in the discharge passage 15'. This causes rotation of the rotor in a clockwise direction as the rotor is shown in Fig. 3, resulting in gradual emptying of the compartment through the discharge. Delivery of liquid to one chamber is cut off just about the time such chamber starts to discharge and the next chamber is brought into position for the delivery of liquid thereto. All this is more fully shown and explained in Benedict Patent No. 1,649,653, above referred to.

In the past the rotor was constituted by a series of circumferentially nesting sheet metal buckets which formed each of the two part liquid measuring compartments, it being assumed that such design was best calculated to insure uniformity and precision in the construction and operation of the rotor. Contrary to previous assumptions it has now been discovered that such rotor construction is not wholly reliable and frequently results in a condition of unbalance of the rotor which is so slight as not to be readily detectable, but which over a time period of a week or a month produces a measurable error in the counter reading of the liquid flow handled by the meter. Such lack of rotative balance could be determined by comparing different rotors of apparently uniform construction. Some rotors would have an apparently perfect balance, while others would have a varying degree of unbalance, and because of the variation in different meters in this respect actual error in each meter could only be determined by individually testing the same over a prolonged period. The difficulty has now been overcome in the present construction by forming the rotor in a manner which general experience would indicate as likely to lessen rather than improve the rotative balance of the rotor. This involves casting the main part of the rotor as a one piece metal unit including an uninterrupted side 13 constituting one side of all the measuring compartments, and all the transversely extending compartment walls 14, 15 and 16, and baffle plate 17. The second side of the cast rotary unit is open. The second side 18 of the rotor closing the rotor is separately formed and removably secured to the main rotary unit by securing means such as elongated bolts 19. The edges of various transverse walls of the liquid measuring chambers are carefully machined to make a fluid-tight fit with removable side wall 18. The main rotary unit and the removable side plate 18 may be cast of iron, brass or some lightweight metal such as aluminum. Such castings are made as thin walled as consistent with strength to minimize weight of the rotor.

Once a mold has been accurately designed for casting of the rotor it will be apparent that perfectly balanced rotors may be uniformly produced, since there is no chance for shape distortion or other defects in rotor construction which might tend to produce rotative unbalance. Further, removal of side plate 18 for occasional cleaning out of sediment depositing in the rotor chambers may be accomplished readily, and such operation cannot possibly impair the operating accuracy of the rotor in view of the fact that all of the compartment walls are of rigid, cast construction.

Figure 1:
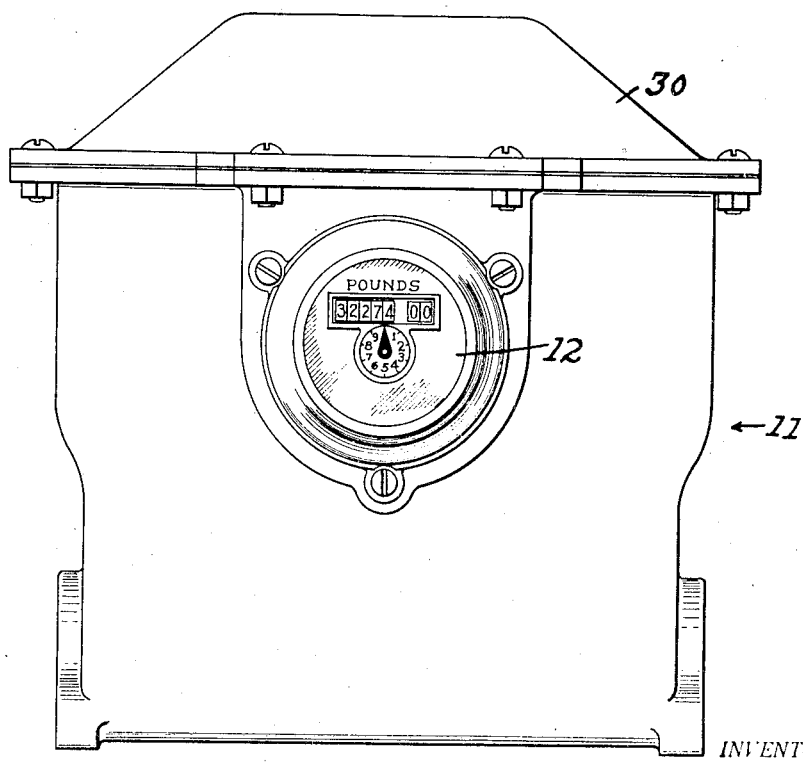
Fig. 1 is a side elevation of a meter embodying the improvements of the present invention.

The rotor is provided with opposite axially extending hollow stub shafts 20 and 21 cast integrally with the opposite rotor sides 13 and 18. By such method of construction, instead of detachably securing shafts to the rotor assembly as formerly, insurance is given that all parts of the rotor are concentric with shafts 20 and 21. Rotatively mounted in a bearing in the central area of the casing side wall, as shown in Fig. 4 and in driving connection with shaft 20 of the rotor is a short driving member 41 for actuating the recorder for counter 12 shown in Fig. 1 but omitted from Fig. 4 for clarity.

It is of course extremely important for accurate operation that the rotor be mounted for rotation substantially free of frictional drag and wobbling. This is here accomplished by employing relatively large size ball bearings. The inner race rings 22 are rigidly fitted over the respective rotor stub shafts 20 and 21. The bearing outer race rings 23 are rigidly secured, as by frictional fitting removable keys 29, in bracket members 24 which, as best shown in Fig. 5, have an arcuate contour fitting the peripheral wall of rings 23. The arcuate brackets 24 are rigidly secured to opposite side wall portions of the meter casing 11. Through this arrangement the rotor is supported for friction-free rotation so as to revolve in accordance with the amount of liquid passing through the meter.

The liquid to be measured enters the meter casing through an inlet port 25 located axially of one side of the casing and defined by a screw threaded bushing 26 sealed to the casing by suitable bolts or other securing means. Adjustably threaded in the inner end of such bushing and communicating with the inlet port 25 is an axially extending nozzle member 27. Such nozzle extends through the hollow rotor shaft 21, and is provided with a radially extending outlet opening 28 through which the liquid is discharged into the rotor compartments as such compartments are successively brought beneath the nozzle. By mounting the nozzle for rotative adjustment in bushing 26 the direction of liquid delivery therefrom can be accurately controlled in relation to the position of the rotor chambers as explained in my patent above referred to.

Referring now particularly to the meter casing 11, the same is constructed to conform as closely as possible to the size of the rotor in the interest of minimizing the space requirement for the meter. This is exemplified by the form of the removable cover 30 and the close spacing of the casing opposite side walls to sides 13 and 18 of the rotor. Because of the latter fact the side walls 31 have to be offset at 32 and formed with more widely spaced upper side portions 33 to form chambers 34 for receiving the rotor shaft and supporting bearings. Such chambers are slightly wider than bearing supporting brackets 24 which are secured to upper side wall portions 33.

While the construction of the casing would appear to have no influence on the operating efficiency of the meter it has been determined by test that a properly balanced rotor mounted on friction-free bearings without a surrounding casing measures liquid extremely accurately. On the other hand, when the same rotor was mounted in a casing its measuring accuracy was noticeably decreased. The error was found to be greater when operating at a high rate than with a low rate of liquid. By changing the former casing construction in certain particulars marked improvement has been obtained and the new meter has an accuracy within 1%, plus or minus, of perfect, not only when operating at or below rated capacity but when operating at up to at least 150% of rated capacity.

In the latter connection it may be explained that the present type of meter is made in a number of different sizes with rated capacities including, for examples, a two hundred and fifty pound size and a twelve thousand pound size. The size selected for particular installation will have a rated capacity well above the normal operating demand so that ordinarily the meter will be operating at only, say, 40% of its rated capacity. At times, however, as for example in a steam heating system in a building when all the radiators are turned on simultaneously, the load on the meter may be anywhere up to 150% above rated capacity. It is important, therefore, that the meter should operate accurately under abnormal load conditions.

The apparent adverse effects of the casing on the operating efficiency of the meter apparently are attributable to the liquid discharging from the rotor into the casing. To avoid pooling of the liquid in the bottom of the casing to an extent which would impose a drag against the lower area of the rotor, and to avoid surging and eddying of the liquid which might produce either a drag or acceleration of the rotor, the casing has been designed with oversized outlet means capable of discharging liquid from the casing at a rate at least up to 150% of the rated operating capacity of the meter. Such outlet means are located endwise of the casing parallel to the direction of rotation of the rotor instead of in the side wall at right angles to such direction as in the former construction. Two outlets are preferably provided, one in each of the casing end walls 36 and 37. The casing bottom wall 35 should be as low adjacent the end walls as in the center of the casing, and the outlet ports 39 and 40 should be located adjacent bottom wall 35. In this manner the liquid discharge chamber 38 in the lower portion of the casing has a substantially greater capacity than in prior models, and the liquid delivered from the rotor as it rotates passes out of the outlet openings freely even under abnormal load conditions without surging around in the outlet chamber 38, or otherwise creating a condition likely to affect the rotation of the rotor.

It will be seen that the individual features of the improved meter are interrelated and serve the common purpose of improving the operating efficiency of the meter. All are directed to securing rotation of the rotor in strict accordance with the rate of liquid flow through the meter so that the liquid will be measured and registered by the counter 12 with a degree of accuracy not heretofore realized. The construction of the rotor 10 as a cast unit insures rotative balance which is an important factor in securing proper rotation. The steady support provided by the ball bearings for friction-free and smooth rotation of the rotor eliminates frictional drag on the rotor so as to further insure proper rotation, and the provision of the oversize outlet means 39 and 40 in the ends of the casing and the oversize discharge chamber 38 avoid liquid drag on the rotor and otherwise avoid adverse effects on rotation from the discharging liquid.

I claim:

1. A liquid measuring meter comprising a rotor divided by partition walls into a circumferentially arranged series of liquid measuring compartments having open inner liquid inlet ends and peripheral outlets, a casing surrounding the rotor, stub shafts extending from the opposite side walls of the rotor, ball bearings having inner rings embracing the respective rotor shafts and having outer rings mounted on the opposite inner side walls of the casing, there being a bore through one of said shafts, and a liquid delivery nozzle extending through said shaft bore and into the rotor.

2. A liquid measuring meter comprising a rotor divided by partition walls into a circumferentially arranged series of liquid measuring compartments having open inner liquid inlet ends and peripheral outlets, a casing surrounding the rotor, shafts extending from the opposite side walls of the rotor, ball bearings having inner rings embracing the respective rotor shafts and having outer rings, bracket members having arcuate seats fitting and supporting the outer bearing rings and being secured to the opposite inner side walls of the casing, there being a bore through one of said rotor shafts, and a liquid delivery nozzle extending through said bore and into the rotor.

3. A liquid measuring meter comprising a balanced cast metal rotor divided by partition walls into a circumferentially arranged series of liquid measuring compartments having open inner liquid inlet ends and peripheral outlets, shafts cast integral with and projecting outwardly from the opposite side walls of the rotor, a casing surrounding the rotor, ball bearings having inner rings embracing and rotating with the respective rotor shafts and outer rings secured to the opposite inner side walls of the casing, there being a bore through one of said shafts, and a liquid delivery nozzle extending through said bore and into the rotor.

4. A liquid measuring meter comprising a rotor divided by partition walls into a circumferentially arranged series of liquid measuring compartments of similar predetermined measuring capacity having open inner liquid inlet ends and peripheral outlets, a nozzle for delivering liquid into the rotor, a casing surrounding the rotor, stub shafts extending from the opposite side walls of the rotor, means supporting the rotor for rotation free of friction drag comprising ball bearings having inner rings embracing the respective shafts and having outer rings secured to the opposite inner side walls of the casing, and means for preventing liquid drag on the rotor comprising a chamber in the casing extending substantially below the rotor and communicating liquid outlet means in the casing extending below the rotor of a capacity to discharge liquid from the chamber of the casing at a rate in excess of the normal liquid measuring operating rate of the rotor.

5. A liquid measuring meter comprising a rotor having partition walls dividing the same into a circumferential series of liquid measuring compartments having open inner liquid inlet ends and peripheral outlets, said rotor being of cast metal and accurately balanced for rotation in correct dependency on the delivery rate of liquid thereto, a casing surrounding the rotor, a nozzle adapted to deliver liquid into the rotor, means for minimizing frictional drag on the rotor during rotation and for promoting balanced and accurate rotation in correct response to the liquid being measured, said means comprising stub shafts rigid with and projecting from the opposite side walls of the rotor at the center thereof and ball bearings having inner rings rigidly embracing said stub shafts and outer rings rigidly mounted on the opposite side walls of the casing, and means for preventing liquid drag on the rotor comprising a chamber in the casing extending substantially below the rotor and communicating liquid outlet means in the casing extending below the rotor of a capacity to discharge liquid from the chamber of the casing at a rate in excess of the normal liquid measuring operating rate of the rotor.

ROBERT HALL.

REFERENCES CITED

The following references are of record in the file of this patent:

UNITED STATES PATENTS

| Number | Name | Date |
|---|---|---|
| 1,092,082 | Staaf et al. | Mar. 31, 1914 |
| 1,455,757 | Barnes | May 15, 1923 |

FOREIGN PATENTS

| Number | Country | Date |
|---|---|---|
| 5,929 | Great Britain | 1899 |
| 143,134 | Austria | Oct. 25, 1935 |
| 209,855 | Great Britain | Jan. 24, 1924 |
| 795,867 | France | Jan. 13, 1936 |